US005849832A

United States Patent [19]

Virnelson et al.

[11] Patent Number: 5,849,832
[45] Date of Patent: Dec. 15, 1998

[54] ONE-COMPONENT CHEMICALLY CURING HOT APPLIED INSULATING GLASS SEALANT

[75] Inventors: Bruce Virnelson, Valencia; Pat Niega, Hollywood, both of Calif.

[73] Assignee: Courtaulds Aerospace, Burbank, Calif.

[21] Appl. No.: 548,086

[22] Filed: Oct. 25, 1995

[51] Int. Cl.[6] .................... C08L 83/07

[52] U.S. Cl. .................... 524/512; 524/487; 524/488; 524/489; 525/104; 525/105; 525/106; 525/477

[58] Field of Search .................... 524/512, 487, 524/488, 489; 525/477, 104, 105, 106

[56] References Cited

U.S. PATENT DOCUMENTS

| | | | |
|---|---|---|---|
| 3,758,996 | 9/1973 | Bowser | 55/385.1 |
| 3,919,023 | 11/1975 | Bowser et al. | 156/107 |
| 4,032,500 | 6/1977 | Koch et al. | 152/504 |
| 4,042,736 | 8/1977 | Flint | 428/34 |
| 4,120,999 | 10/1978 | Chenel et al. | 428/34 |
| 4,153,594 | 5/1979 | Wilson, Jr. | 524/59 |
| 4,215,164 | 7/1980 | Bowser | 428/34 |
| 4,425,389 | 1/1984 | Schöllhorn et al. | 428/34 |
| 4,431,691 | 2/1984 | Greenlee | 428/34 |
| 4,476,169 | 10/1984 | Nishino et al. | 428/34 |
| 4,530,195 | 7/1985 | Leopold | 52/717.02 |
| 4,587,289 | 5/1986 | Comert et al. | 524/505 |
| 4,622,249 | 11/1986 | Bowser | 428/34 |
| 4,669,241 | 6/1987 | Kelly | 52/204.597 |
| 4,775,719 | 10/1988 | Markevka et al. | 525/125 |
| 4,808,255 | 2/1989 | Markevka et al. | 156/307.3 |
| 4,820,368 | 4/1989 | Markevka et al. | 156/307.3 |
| 4,835,130 | 5/1989 | Box et al. | 502/62 |
| 4,891,269 | 1/1990 | Markevka et al. | 428/423.1 |
| 4,950,344 | 8/1990 | Glover et al. | 156/109 |
| 4,965,117 | 10/1990 | Lautenschlaeger et al. | 428/182 |
| 4,985,535 | 1/1991 | Takada et al. | 528/272 |
| 4,994,309 | 2/1991 | Reichert et al. | 428/34 |
| 5,017,653 | 5/1991 | Johnston | 525/89 |
| 5,019,638 | 5/1991 | Müller et al. | 528/83 |
| 5,061,749 | 10/1991 | Ito et al. | 524/850 |
| 5,075,407 | 12/1991 | Cody et al. | 528/71 |
| 5,091,444 | 2/1992 | Bauer et al. | 523/209 |
| 5,106,663 | 4/1992 | Box | 428/34 |
| 5,120,379 | 6/1992 | Noda et al. | 156/107 |
| 5,177,916 | 1/1993 | Misera et al. | 52/172 |
| 5,189,096 | 2/1993 | Boutillier et al. | 525/56 |
| 5,234,730 | 8/1993 | Lautenschlaeger et al. | 428/34 |
| 5,286,787 | 2/1994 | Podola et al. | 524/773 |
| 5,304,623 | 4/1994 | Ito et al. | 528/28 |
| 5,324,778 | 6/1994 | Boutiullier et al. | 525/56 |
| 5,340,887 | 8/1994 | Vincent et al. | 525/477 |
| 5,342,873 | 8/1994 | Merz et al. | 524/425 |
| 5,385,986 | 1/1995 | Frihart et al. | 525/420.5 |
| 5,641,575 | 6/1997 | Farbstein | 428/423.1 |

*Primary Examiner*—Marion McCamish
*Assistant Examiner*—John J. Guarriello
*Attorney, Agent, or Firm*—Gifford, Krass, Groh, Sprinkle, Patmore, Anderson & Citkowski, P.C.

[57] ABSTRACT

This invention relates generally to sealants for insulating glass units. More specifically, this invention is a one-component, hot applied, chemically curing sealant for edge sealing insulating glass units. The sealant contains a thermoplastic hot melt resin blended with an atmospheric curing resin. The hot melt resin functions as the meltable component during the initial application, and supplies strength immediately upon cooling. The polymer phase then begins to cure by reaction with atmospheric oxygen and/or moisture to form a cross-linked thermoset elastomer which is temperature resistant. At this point, the hot melt resin functions as an inert plasticizer within the cured polymer phase. The sealant of the present invention may additionally include plasticizers, fillers, pigments, catalysts and the like.

12 Claims, No Drawings

ONE-COMPONENT CHEMICALLY CURING HOT APPLIED INSULATING GLASS SEALANT

BACKGROUND OF THE INVENTION

I Field of the Invention

This invention relates generally to methods and compositions relating to the construction of insulating glass units and in particular, methods and compositions for making a sealant which is applied at the edges of insulating glass units for the purpose of adhering the components of the unit together, and sealing the unit from subsequent moisture penetration. Most specifically, the present invention relates to a one-component edge sealant for insulating glass units which is applied as a liquid or paste at an elevated temperature, then reversibly and rapidly solidifies upon cooling, and thereafter irreversibly solidifies upon exposure to ambient atmospheric conditions.

II Description of the Prior Art

Insulating glass units generally comprise a pair of glass sheets maintained in a spaced apart relationship to each other by a spacing and sealing assembly which extends around the periphery of the inner, facing surfaces of the glass sheets, to define a sealed and insulating air space between the glass sheets. A spacer assembly generally comprises an inner spacer-dehydrator element which extends around the periphery of the inside facing surfaces of the glass sheets. The inner surfaces of the glass sheets are attached to the outer surface of the spacer assembly by means of a sealant or adhesive. Generally, the sealant or adhesive is also used to seal the edges of the glass unit so as to establish a barrier which prevents moisture from penetrating into the interior of the unit.

The two major types of sealants currently used in the insulating glass industry are the thermoplastic one-part hot melt butyl type, and the chemically curing, thermoset products generally from the generic families of polysulfide, polyurethane, and silicone. The former, or the hot melt butyl insulating glass sealants, have been used with moderate success for a number of years in the insulating glass industry. However, there are significant shortcomings with this technology that have limited the application of hot melt butyl insulating glass sealants. Primarily, the hot melt butyl is thermoplastic, and not thermoset. That is, these sealants are subject to softening when exposed to heat. Therefore, the insulating glass units sold in the marketplace, when placed under load, will flow or deform to relieve the load. This characteristic is exaggerated at high temperatures, which can occur in insulating glass units, especially those utilizing solar control glass. As a result, insulating glass units made with hot melt butyl sealants have difficulty passing the industry standard test due to stress and temperature, and can only be used successfully in relatively small, light units. Additionally, extreme care must be taken to support the insulating glass unit during handling, shipping and installation, resulting in additional costs.

Furthermore, the hot melt sealants previously employed must be applied to the units at temperatures exceeding 300° F. These high temperature requirements have resulted in worker injury, due to burns, as well as increased manufacturing costs due to higher energy consumption and the need for specialized, high-temperature equipment. Any attempts to utilize lower temperature hot melts have resulted in greater flow problems with the sealant, as has previously been discussed.

The thermoset products which are currently used are generally two-component sealants which are mixed at the point of application at room temperature. The sealants then cure slowly by reaction with the supplied catalyst or through reaction with moisture. This slow cure requires that the insulating glass units be held in inventory from several hours to days waiting for the sealant to harden. Additionally, these two-component systems are more difficult to employ and further increase manufacturing costs because of the additional steps involved in their use.

U.S. Pat. No. 4,032,500 discloses a two-component, curable sealant composition, each component being individually storage-stable. Each component contains oil-extended low molecular weight uncured butyl rubber. The components are mixed together just prior to use in an approximately one to one volume ratio.

U.S. Pat. No. 4,042,736 discloses a single application sealant for use in insulating glass units comprising a partially cross-linked hot melt butyl rubber sealant. The patent further discloses that complete cross-linking of the sealant will occur when the composition is post heated from about 325° F. to about 425° F. Sufficient heat is applied to the exterior face of the sealant composition to raise the temperature of the outermost portion of the sealant composition to this temperature range, while the innermost portion of the sealant composition remains at a temperature substantially below this temperature range.

U.S. Pat. No. 4,808,255 discloses an extrudable reactive hot melt urethane adhesive containing a urethane prepolymer, a tackifying resin and a thermoplastic resin. However, since the curing of the urethane liberates $CO_2$ gas, adhesives utilizing a urethane-curing chemistry are highly unsuitable for the insulating glass industry, as bubbles can get trapped at the interface of the sealant and the glass.

The present invention overcomes all of the problems of the prior art in that it provides an edge sealant for use in insulating glass units by providing a silicon-functionalized, chemically curing thermoset product with inherently high strength and resistance to flow, while providing the convenience of a one-part sealant with hot melt-type application properties. Because the present sealant employs compatible compositions which solidify at different rates and through different mechanisms, the present invention can be applied at a lower temperature than traditional hot melts, and also provides sufficient handling strength to the unit faster than traditional chemical-cure products, thereby combining the best properties of both the hot melt and chemically curing technologies into a successful sealant for the insulating glass industry. The sealant of the present invention is designed to be applied at elevated temperatures in the range of 125°–250° F., in the form of a liquid or paste which turns back to a solid immediately upon cooling. The product then cures to a permanent solid elastomer by reaction with atmospheric oxygen and/or moisture. These and other advantages of the present invention will be readily apparent from the description, the discussion, and examples which follow.

SUMMARY OF THE INVENTION

There is disclosed herein an edge sealant for insulating glass units comprising a thermoplastic hot melt resin and an atmospheric curing resin of the type which polymerizes upon exposure to an ambient atmosphere, the atmospheric curing resin being combined with the thermoplastic hot melt resin as a single material. The thermoplastic hot melt resin and the atmospheric curing resin can comprise identical compositions. The present sealant comprises, by weight, approximately 10–90% by weight of a thermoplastic hot melt resin, together with 5–50% by weight of an atmospheric curing resin.

In particular embodiments, the thermoplastic hot melt resin comprises a solid chlorinated paraffin. The atmospheric curing resin is preferably a silane terminated polyurethane. The sealant may also include ancillary ingredients such as plasticizers, catalysts, and fillers. Small volume additives may include colorants, rheological materials, weatherability improvers, and/or pigments, as are known in the art.

DETAILED DESCRIPTION OF THE INVENTION

The present invention is directed to a one-component, hot applied, chemically curing edge sealant for insulating glass units. The purpose of the sealant is to provide structural integrity to the unit while sealing out moisture and preventing the exchange of gasses. The edge sealant also resists environmental attack from water, UV, and temperature extremes.

The sealant of the present invention is designed to be applied at an elevated temperature of approximately 125°–250° F. in the form of a liquid or a paste, which then turns back to a solid immediately upon cooling. The product then begins curing to a permanent solid elastomer by reaction which atmospheric moisture and/or oxygen. The present invention combines the application properties of a hot melt product with its attendant rapid cooling to a solid, which allows the immediate handling of the insulating glass unit. The sealant of the present invention then cures chemically to provide a permanent elastomeric, temperature-resistant sealant which provides the structural integrity for the insulating glass unit.

The sealant of the present invention comprises a thermoplastic hot melt resin, and an atmospheric curing resin of the type which polymerizes upon exposure to an ambient atmosphere, the atmospheric curing resin being combined with the thermoplastic hot melt resin as a single material. This is understood to mean that on a macroscopic scale, the sealant comprises a substantially homogeneous mixture; it may also include compositional variations on a microscopic scale. In an alternate embodiment, the thermoplastic hot melt resin and the atmospheric curing resin may comprise an identical composition. The hot melt resin functions as the meltable component during the initial application and supplies strength immediately upon cooling. The polymer phase then begins to cure by reaction with atmospheric moisture to form a cross-linked thermoset elastomer which is temperature resistant. At this point, the hot melt resin functions as an inert plasticizer within the cured polymer phase.

Strength properties in the hot melt phase can be controlled by the type and quantity of the hot melt resin and filler selection. Ultimate strength of the edge sealant is controlled by the type and cross-linked density of the curing polymer. Within the context of this disclosure, atmospheric “curing resins” are meant to include polymeric materials which cross-link and/or polymerize upon exposure to a component of the ambient atmosphere, typically oxygen or water vapor.

Preferably, the thermoplastic hot melt resin is present in the sealant in a concentration of 10–90% by weight, more preferably 30–80% by weight and most preferably 40–65% by weight. The atmospheric curing resin is typically present in the sealant in a range of 5–50% by weight more preferably 10–40% by weight, and most preferably 18–28% by weight. The sealant may also include a catalyst, plasticizers, fillers, pigments, weatherability improvers and the like, as are known in the art.

The thermoplastic hot melt resin is preferably one which solidifies immediately upon cooling. It may fuher comprise polyethylenes, polyolefins, polyvinyl acetate polyamides, hydrocarbon resins, asphalts, bitumens, waxes, paraffins, crude rubbers, fluorinated rubbers, polyvinyl chloride, polyamides, fluorocarbons, polystyrene, polypropylenes, cellulosic resins, acrylic resins, thermoplastic elastomers, styrene butadiene resins, ethylene propylene diene monomer, polyterpenes, and mixtures thereof. One particularly preferred thermoplastic hot melt resin is a mixture of solid chlorinated paraffin and an epoxidized soya oil. Another preferred thermoplastic hot melt resin is a mixture of solid chlorinated paraffin and polyisobutylene.

The atmospheric curing resin begins to cure subsequently to the cooling of the hot melt resin by reaction with oxygen and/or atmospheric moisture to form a cross-linked thermoset elastomer which is temperature resistant. A preferable group of atmospheric curing resins comprise moisture cure polyurethanes, moisture cure polysulfides, polydimethylsiloxanes, oxygen cure polysulfides, and mixtures thereof, some containing silicon functionalities. Some specific atmospheric curing resins include alkoxy, acetoxy, oxyamino silane terminated polyethers and polyether urethanes; alkyl siloxane polymers crosslinked with alkoxy, acetoxy, oxyamino organo functional silanes; moisture curable isocyanate functional polyoxyalkaline polymers and polyalkaline polymers; thiol functional polymers and oligomers (such as polyethers, polyether urethanes, polysulfides, polythioethers), suitably catalyzed to produce moisture curable systems; epoxide functional polymers and oligomers with moisture deblockable crosslinkers; acrylic functional polymers with deblockable crosslinkers, and mixtures thereof. Most preferably, the atmospheric curing resin comprises alkoxy silane terminated polyurethanes, alkoxy silane terminated polyethers, polydimethylsiloxane polymers, and mixtures thereof. In a most preferred formulation, the atmospheric curing resin comprises a mixture of Permapol MS (alkoxy silane terminated polyurethane, manufactured by Courtaulds Coatings, Inc.) and an organo functional silane.

As has already been disclosed, in an alternate embodiment, the thermoplastic hot melt resin and the atmospheric curing resin can comprise an identical composition. One preferred formulation comprises high molecular weight silicon-terminated urethane prepolymers. Another formulation comprises silicon-functionalized Kraton polymers (block copolymers, manufactured by Shell). Kraton polymers are block copolymers of several types such as SBS (styrene-butadiene-styrene), SIS (styrene-isoprene-styrene), and SEBS (styrene-ethylene/butylene-styrene). Yet another formulation comprises Kraton polymers with other functional groups which provide for rapid solidification upon cooling, followed by chemical cure upon exposure to atmospheric conditions.

The specific organic catalyst used in the present invention will depend upon the particular atmospheric curing resin which is used. Preferable catalysts comprise organo tin compounds, aliphatic titanates (having from 1–12 carbon atoms) such as lower alkyl titanates, and amines. Most preferably the catalyst comprises dibutyltin dilaurate, dibutyltin diacetate, tetrabutyl titanate, and tetraethyl titanate.

Although the sealant will still cure without the addition of the catalyst, the addition of a catalyst may provide for faster curing times, which may be necessary in certain situations. It may also be desirable, in some instances, to add additional fillers, pigments, rheological agents and like.

Strength properties in the hot melt phase depends on the type and quantity of the hot melt resin, and also the filler selection. One preferred filler is talc. Other fillers can be used, as is known in the art. The range of fillers may be selected by one of skill in the art and added in an amount sufficient to impart the appropriate strength to the hot melt phase, as well as to impart desirable application properties to the sealant. The sealant of the present invention should be easy to handle and apply to the insulating glass units.

The sealant of the present invention may be prepared in the following manner. Preferably, the thermoplastic hot melt resin, or mixtures thereof, is first disposed in a mixing vessel at an elevated temperature. In one preferred embodiment, the mixing vessel is capable of carrying out mixing under a vacuum and which further includes a mixer that comprises a variable speed, multi-shaft unit, having a low speed sweep blade, a high speed disperser, and a low speed auger. The filler is then added to the hot melt resin and mixing begins at low speed. Thereafter, the atmospheric curing resin, or mixtures thereof, to which additional filler has been added to form an atmospheric curing resin composition, is added to the mixture subsequent to turning on the vacuum. At the point the atmospheric curing resin composition is added, the mixing is conducted under vacuum so as to eliminate any exposure of the mixture to atmospheric conditions, and also to remove residual water from the raw materials, thereby improving package stability. Small volume additives such as pigments, weatherability improvers and the like can be added before the introduction of the atmospheric curing resin composition, while any catalyst may be added after. The material is maintained under essentially dry conditions until such time as it is ready to be applied to the insulating glass unit. In other preferred embodiments, the mixing may be carried out under a blanket of dry, inert gas.

The edge sealant of the present invention is applied to the insulating glass unit at elevated temperatures, approximately 125°–250° F. in the form of a liquid or a paste. Thereafter the sealant rapidly but reversibly cools into a solid. The sealant then begins to cure to a permanent solid elastomer by reaction with atmospheric oxygen and/or moisture. The sealant of the present invention is applied to the unit as a single material, therefore eliminating the need to combine several components together at the point of application.

The present invention will best be illustrated by the following series of examples:

EXAMPLE 1

| MATERIAL | CHARGE WEIGHT | % WEIGHT | PROCEDURE |
|---|---|---|---|
| 1. Chlorinated Plasticizer | 120.0 lbs | 6.0% | Charge. Mix at low speed. |
| 2. Epoxidized Soya Oil | 100.0 lbs | 5.0% | Charge. |
| 3. Solid Chlorinated Paraffin | 760.0 lbs | 38.0% | Charge. Turn on disperser at medium speed. Continue mixing until the material becomes fluid. |
| 4. Carbon Black | 94.0 lbs | 4.7% | Charge one bag at a time. |
| 5. Talc | 520.0 lbs | 26.0% | Charge one bag at a time. Turn on vacuum. Mix with low speed blades at low setting and dispersion at medium speed for 30 minutes. |
| 6. Atmospheric Curing Resin Composition* | 404.0 lbs | 20.2% | Charge. Turn on vacuum. Mix at low speed all blades for 15 minutes. Moisture content test. |
| 7. Dibutyltin Dilaurate | 2.0 lbs | 0.1% | Charge. Turn on vacuum. |
| | | | Then close vacuum. Mix at low speed all blades for 15 minutes. |
| | 2000.0 | 100.0% | |

Note: Preheat the pot to 180° F. Maintain that temperature throughout the process.

A preferred chlorinated plasticizer is a 52% chlorine, long chain normal paraffin (Cerechlor S52, ICI). A preferred epoxidized soya oil is a high molecular weight soybean oil epoxide (Paraplex G-62, Rohm and Haas). A preferred solid chlorinated paraffin is a 70% chlorine, long chain normal paraffin (Chlorez 700-S, Dover Chemical).

EXAMPLE 2

| MATERIAL | CHARGE WEIGHT | % WEIGHT | PROCEDURE |
|---|---|---|---|
| 1. Chlorinated Plasticizer | 86.0 lbs | 5.0% | Charge. Mix at low speed. Save 5 lbs for step 9. |
| 2. Polyisobutylene | 172.0 lbs | 8.6% | Charge. |
| 3. Solid Chlorinated Paraffin | 947.0 lbs | 47.3% | Charge one bag at a time. Turn on disperser at medium speed. Continue |

-continued

| MATERIAL | CHARGE WEIGHT | % WEIGHT | PROCEDURE |
|---|---|---|---|
| | | | mixing until the material becomes fluid. |
| 4. Carbon Black | 17.0 lbs | 1.0% | Charge one bag at a time. |
| 5. Talc | 207.0 lbs | 10.3% | Charge one bag at a time. Turn on vacuum. Mix with low speed blades at low setting dispersion at medium speed for 30 minutes. |
| 6. Atmospheric Curing Resin Composition* | 517.0 lbs | 27.63% | Charge. Turn on vacuum. Mix at low speed all blades for 15 minutes. |
| 7. Dibutyltin Dilaurate | 1559.0 grms | 0.17% | Slurry with 5 lbs of chlorinated plasticizer from step 1. Turn on vacuum. Then close vacuum. Mix at low speed all blades for 15 minutes. |
| | 2001.0 | 100.0% | |

Note: Preheat the pot to 180° F. Maintain that temperature throughout the process.

A preferred polyisobutylene is a low molecular weight polyisobutylene (Vistanex LM, Exxon).

*ATMOSPHERIC CURING RESIN COMPOSITION

| MATERIAL | CHARGE WEIGHT | % WEIGHT | PROCEDURE |
|---|---|---|---|
| 1. Permapol MS Polymer | 950.0 lbs | 58.3% | Charge. Mix at low speed. |
| 2. Organo Functional Silane #1 | 13.5 lbs | 0.8% | Charge. |
| 3. Organo Functional Silane #2 | 13.5 lbs | 0.8% | Charge. |
| 4. Talc | 652.0 lbs | 40.0% | Charge one bag at a time. Turn on vacuum. Mix to uniformity. Moisture content test. |
| | 1629.0 | 100.0% | |

The first organo functional silane is preferably vinyl silane, or vinyltrimethoxysilane (A-171, OSI). The second organo functional silane is preferably epoxy silane, or glycidoxypropyltrimethoxysilane (A-187, OSI). The two silanes are different at the organo functional end of the molecule.

The foregoing discussion and examples are merely meant to illustrate particular embodiments of the invention, and are not meant to be limitations on the practice thereof. It is the following claims, including all equivalents, which define the scope of the invention.

What is claimed is:

1. In an insulating glass unit having a first glazing pane maintained in a spaced apart relation with a second glazing pane by a spacer, an edge sealant for said insulating glass unit, said sealant comprising:

a thermoplastic hot-melt resin, said thermoplastic hot melt resin having a melt temperature of between approximately 125°–250° F., and an atmospheric curing resin, said atmospheric curing resin polymerizing upon exposure to a component of the atmosphere, said component comprising a compound selected from the group consisting of oxygen, water vapor, and mixtures thereof, said atmospheric curing resin comprising a silicon-containing atmospheric curing resin, said atmospheric curing resin being combined with said thermoplastic hot melt resin as a single material, whereby said sealant is in a liquid phase at a temperature above room temperature of around 68°–77° F., reversibly solidifies upon cooling to room temperature of around 68°–77° F., and irreversibly solidifies upon subsequent exposure to said component of the atmosphere.

2. The sealant of claim 1, wherein said thermoplastic hot melt resin comprises approximately 10–90% by weight of said sealant.

3. The sealant of claim 1, wherein said atmospheric curing resin component comprises approximately 5–50% by weight of said sealant.

4. A one-part edge sealant, said sealant comprising:

a thermoplastic hot melt resin, said hot melt resin having a melt temperature of between approximately 125°–250° F., and a silicon-containing atmospheric curing resin, said atmospheric curing resin polymerizing upon exposure to a component of the atmosphere, said component comprising a compound selected from the group consisting of oxygen, water vapor, and mixtures thereof, said atmospheric curing resin being combined with said thermoplastic hot melt resin as a single material, whereby said sealant is in a liquid phase at a temperature above room temperature of around 68°–77° F., reversibly solidifies upon cooling to room temperature of around 68°–77° F., and irreversibly solidifies upon subsequent exposure to said component of the atmosphere.

5. The sealant of claim 4, wherein said thermoplastic hot melt resin comprises a compound selected from the group consisting of polyethylenes, polyolefins, polyvinyl acetate polyamides, hydrocarbon resins, asphalts, bitumens, waxes, paraffins, crude rubbers, fluorinated rubbers, polyvinyl chloride, polyamides, fluorocarbons, polystyrene, polypropylenes, cellulosic resins, acrylic resins, thermoplastic elastomers, styrene butadiene resins, polyterpenes, ethylene propylene diene monomer, and mixtures thereof.

6. The sealant of claim 4, wherein said thermoplastic hot melt resin comprises a compound selected from the group consisting of solid chlorinated paraffin, polyisobutylene, epoxidized soya oil, and mixtures thereof.

7. The sealant of claim 4, wherein said atmospheric curing resin comprises a compound selected from the group consisting of moisture curing urethanes, moisture curing polysulfides, oxygen curing polysulfides, and mixtures thereof.

8. The sealant of claim 4, wherein said atmospheric curing resin comprises a compound selected from the group consisting of alkoxy silane terminated polyurethanes, alkoxy silane terminated polyethers, polydimethylsiloxane resins, organo functional silanes, and mixtures thereof.

9. The sealant of claim 4, wherein said thermoplastic hot melt resin and said atmospheric curing resin comprise the same composition.

10. The sealant of claim 9, wherein said thermoplastic hot melt resin and said atmospheric curing resin comprise a compound selected from the group consisting of high molecular weight silicon-containing urethane prepolymers and silicon-containing acrylonitrile butadiene copolymers.

11. The sealant of claim 4 further comprising a compound selected from the group consisting of plasticizers, fillers, pigments, catalysts, weatherability improvers, and mixtures thereof.

12. A one-part edge sealant, said sealant comprising:

10–90% by weight of said sealant of a thermoplastic hot melt resin, said hot melt resin comprising a compound selected from the group consisting of solid chlorinated paraffin, epoxidized soya oil, polyisobutylene, and mixtures thereof, and 5–50% by weight of said sealant of an atmospheric curing resin which polymerizes upon exposure to a component of the atmosphere, said component comprising a compound selected from the group consisting of oxygen, water vapor, and mixtures thereof, said atmospheric curing resin comprising a compound selected from the group consisting of an alkoxy silane terminated polyurethane, an organo functional silane, and mixtures thereof, said atmospheric curing resin being combined with said thermoplastic hot melt resin as a single material, whereby said sealant is in a liquid phase at a temperature above room temperature of around 68°–77° F., reversibly solidifies upon cooling to room temperature of around 68°–77° F., and irreversibly solidifies upon subsequent exposure to said component of the atmosphere.

* * * * *